United States Patent
Barfus, Jr. et al.

(10) Patent No.: US 10,092,139 B2
(45) Date of Patent: Oct. 9, 2018

(54) LOW PROFILE MOTOR FOR PORTABLE APPLIANCES

(71) Applicant: Whirlpool Corporation, Benton Harbor, MI (US)

(72) Inventors: Dan Christian Barfus, Jr., St. Joseph, MI (US); Paul S. Paget, Kalamazoo, MI (US); James R. Devlaminck, Buchanan, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 583 days.

(21) Appl. No.: 14/508,108

(22) Filed: Oct. 7, 2014

(65) Prior Publication Data

US 2015/0305565 A1   Oct. 29, 2015

Related U.S. Application Data

(60) Provisional application No. 61/985,018, filed on Apr. 28, 2014.

(51) Int. Cl.
*B01F 13/00* (2006.01)
*A47J 43/00* (2006.01)
(Continued)

(52) U.S. Cl.
CPC ....... *A47J 43/0465* (2013.01); *B01F 13/0827* (2013.01); *B01F 15/0048* (2013.01);
(Continued)

(58) Field of Classification Search
CPC ..... A47J 43/046; A47J 43/0465; B01F 7/162; B01F 13/0827; B01F 15/0048;
(Continued)

(56) References Cited

U.S. PATENT DOCUMENTS

| 2,549,121 A | 4/1951 | Osterheld |
| 2,666,354 A | 10/1953 | Murray |

(Continued)

FOREIGN PATENT DOCUMENTS

| DE | 3530764 A1 | 3/1986 |
| DE | 102011052745 A1 | 2/2013 |

(Continued)

OTHER PUBLICATIONS

European Patent Appl. No. 14160043.7 filed Mar. 17, 2014, Applicant: Whirlpool Corporation, European Search Report re: same, dated Jun. 25, 2014.

*Primary Examiner* — Anshu Bhatia
(74) *Attorney, Agent, or Firm* — Price Heneveld LLP

(57) ABSTRACT

A blending appliance includes a housing having a jar receiving portion defined between an upper housing and a base portion laterally extending from the housing. A blender jar is adapted to be laterally received within the jar receiving portion and includes a jar base and a receptacle portion. A stator is disposed in the base portion of the housing and is adapted to create an electromagnetic field to drive a rotatable magnetic coupler disposed in the jar base as part of a magnetic coupling system. The rotatable magnetic coupler is coupled to a drive shaft that is further coupled to a blade assembly disposed within the receptacle portion of the blender jar. The blade assembly is configured to process ingredients within the receptacle portion of the blender jar as coupled to the rotatable magnetic coupler.

18 Claims, 2 Drawing Sheets

(51) Int. Cl.
*A47J 43/046* (2006.01)
*B01F 15/00* (2006.01)
*B01F 13/08* (2006.01)

(52) U.S. Cl.
CPC .......... *B01F 15/00538* (2013.01); *B01F 2015/00649* (2013.01); *B01F 2215/0014* (2013.01)

(58) Field of Classification Search
CPC ...... B01F 15/00538; B01F 2015/00649; B01F 2215/0014
USPC .................................................. 366/273, 274
See application file for complete search history.

(56) References Cited

U.S. PATENT DOCUMENTS

| | | |
|---|---|---|
| 2,702,571 A | 2/1955 | Murray |
| 3,140,079 A | 7/1964 | Baermann |
| 3,168,294 A | 2/1965 | Hasumura |
| 3,887,169 A | 6/1975 | Maynard |
| 3,951,351 A | 4/1976 | Ernster et al. |
| 4,071,789 A | 1/1978 | Ernster et al. |
| 4,078,246 A | 3/1978 | Berthoux et al. |
| 4,111,372 A | 9/1978 | Hicks et al. |
| 4,174,073 A | 11/1979 | Maher et al. |
| 4,285,473 A | 8/1981 | Williams |
| 4,286,885 A | 9/1981 | Uibel et al. |
| 4,371,048 A | 2/1983 | Hansen |
| 4,381,048 A | 4/1983 | Haverkamp et al. |
| 4,422,343 A | 12/1983 | Falkenbach et al. |
| 4,501,538 A | 2/1985 | Bray et al. |
| 4,521,819 A | 6/1985 | Elsing et al. |
| 4,600,155 A | 7/1986 | Musseau et al. |
| 4,613,086 A | 9/1986 | Granum et al. |
| 4,620,479 A | 11/1986 | Diamond et al. |
| 4,629,131 A | 12/1986 | Podell |
| 4,647,727 A | 3/1987 | Sontheimer |
| 4,653,519 A | 3/1987 | Kanner |
| 4,706,896 A | 11/1987 | Moon-Kau |
| 4,734,604 A | 3/1988 | Sontheimer et al. |
| 4,822,172 A | 4/1989 | Stottmann |
| 4,824,029 A | 4/1989 | Stottmann et al. |
| 5,323,691 A | 6/1994 | Reese et al. |
| 5,325,643 A | 7/1994 | Mitchell et al. |
| 5,353,697 A | 10/1994 | Venturati et al. |
| 5,395,060 A | 3/1995 | Hackel et al. |
| 5,407,272 A | 4/1995 | Meier |
| 5,486,050 A | 1/1996 | Lenting |
| 5,524,530 A | 6/1996 | Nijzingh et al. |
| 5,556,198 A | 9/1996 | Dickson, Jr. et al. |
| 5,758,965 A | 6/1998 | Gambrill et al. |
| 5,779,359 A | 7/1998 | Gambrill et al. |
| 6,095,677 A | 8/2000 | Karkos, Jr. et al. |
| 6,189,441 B1 | 2/2001 | Beaudet et al. |
| 6,210,033 B1 * | 4/2001 | Karkos, Jr. ........... A23G 9/045 366/205 |
| 6,218,247 B1 | 11/2001 | Nunzio et al. |
| 6,325,312 B1 | 12/2001 | Karkos, Jr. |
| 6,336,603 B1 | 1/2002 | Karkos, Jr. et al. |
| 6,364,522 B2 | 4/2002 | Kolar et al. |
| 6,402,365 B1 | 6/2002 | Wong |
| 6,513,966 B1 | 2/2003 | Gort-Barten et al. |
| 6,588,930 B2 | 7/2003 | Wilson |
| 6,632,013 B2 | 10/2003 | Wulf et al. |
| 6,634,580 B2 | 10/2003 | Obersteiner |
| 6,641,298 B2 | 11/2003 | Safont et al. |
| 6,748,853 B1 | 6/2004 | Brady et al. |
| 6,793,167 B2 | 9/2004 | Karkos, Jr. et al. |
| 6,889,924 B2 | 5/2005 | Pavlovic et al. |
| 7,318,375 B2 | 1/2008 | Huang |
| 7,354,192 B2 | 4/2008 | Jejcic |
| 7,387,430 B2 | 6/2008 | Short et al. |
| 7,448,789 B2 | 11/2008 | Boquet et al. |
| 7,632,007 B2 | 12/2009 | Wulf et al. |
| 7,708,215 B2 | 5/2010 | Wang |
| 7,942,094 B2 | 5/2011 | Kounlavong et al. |
| 7,993,054 B2 | 8/2011 | Wulf et al. |
| 8,042,990 B2 | 10/2011 | Pryor, Jr. et al. |
| 8,056,848 B1 | 11/2011 | Liang |
| 8,087,818 B2 | 1/2012 | Drees |
| 8,109,668 B2 | 2/2012 | Garman et al. |
| 8,282,268 B2 | 10/2012 | Karkos, Jr. et al. |
| 8,282,269 B2 | 10/2012 | Terentiev |
| 2001/0002892 A1 | 6/2001 | Karkos, Jr. et al. |
| 2002/0079393 A1 | 6/2002 | Karkos, Jr. et al. |
| 2005/0023193 A1 | 2/2005 | Kim |
| 2006/0092761 A1 | 5/2006 | Terentiev |
| 2006/0158958 A1 | 7/2006 | Romanik |
| 2007/0140048 A1 | 6/2007 | Ismail |
| 2007/0286015 A1 | 12/2007 | Markle |
| 2008/0008028 A1 | 1/2008 | Terentiev et al. |
| 2008/0255636 A1 | 10/2008 | Delmain et al. |
| 2009/0308265 A1 | 12/2009 | Obersteiner |
| 2010/0214867 A1 * | 8/2010 | Karkos, Jr. ........... A47J 43/085 366/272 |
| 2011/0046786 A1 | 2/2011 | Wulf et al. |
| 2011/0063941 A1 | 3/2011 | Seidler et al. |
| 2011/0079596 A1 | 4/2011 | Krasznai et al. |
| 2011/0203462 A1 | 8/2011 | Boussemart et al. |
| 2011/0293807 A1 | 12/2011 | Dushine et al. |
| 2012/0002501 A1 | 1/2012 | Ulstad et al. |
| 2012/0027331 A1 | 2/2012 | Liang |
| 2012/0085851 A1 | 4/2012 | Allen |
| 2012/0192727 A1 | 8/2012 | Wu |
| 2012/0294111 A1 | 11/2012 | Rosengren et al. |
| 2013/0001220 A1 | 1/2013 | Vidal et al. |
| 2013/0028044 A1 | 1/2013 | Karkos, Jr. et al. |
| 2013/0134245 A1 | 5/2013 | Gushwa |
| 2013/0220764 A1 | 8/2013 | Choi et al. |

FOREIGN PATENT DOCUMENTS

| | | |
|---|---|---|
| EP | 1139839 B1 | 10/2001 |
| EP | 1562461 B1 | 8/2005 |
| EP | 2005867 A1 | 12/2008 |
| EP | 2545830 A1 | 1/2013 |
| JP | H0835664 A | 2/1996 |
| WO | 0041607 A1 | 7/2000 |

* cited by examiner

LOW PROFILE MOTOR FOR PORTABLE APPLIANCES

CLAIM OF PRIORITY

This application claims priority to and the benefit under 35 U.S.C. § 119(e) of U.S. Provisional Patent Application No. 61/985,018, filed Apr. 28, 2014, entitled "LOW PROFILE MOTOR FOR PORTABLE APPLIANCES," which is hereby incorporated herein by reference in its entirety.

BACKGROUND OF THE INVENTION

Portable appliances, such as food processors and blenders, are known to have a magnetic coupler system that allows for magnetic coupling between a motor-driven rotor in a base portion of the appliance and a rotor disposed in the base portion of a jar or receptacle that is received on the appliance base. Such an apparatus can create unnecessary noise by have rotating, or otherwise moving, mechanical parts in the base of the appliance that further rotate a blade assembly and associated coupler in a receptacle received on the appliance. Thus, a magnetic coupling system is desired wherein the rotor within the receptacle jar has permanent magnets that are driven by a stator within the base of the appliance, such that there are no moving parts with the base of the appliance. This type of system eliminates noise while still adequately powering the appliance. The stator can be disposed beneath the jar as received on the appliance, or can be configured around the base of the jar in a set-in configuration.

BRIEF SUMMARY OF THE INVENTION

One aspect of the present invention includes a blending appliance having a housing with a jar receiving portion defined between an upper housing and a base portion laterally extending from the housing. A blender jar, having a jar base and a receptacle portion, is configured to be laterally received within the jar receiving portion of the housing. A magnetic coupling system is part of the blending appliance and includes a rotatable magnetic coupler disposed in the jar base of the blender jar and a stator disposed in the base portion of the housing. The stator is configured to generate an electromagnetic field to magnetically rotate the rotatable magnetic coupler within the jar base. A blade assembly is disposed in the receptacle portion of the jar and is coupled to a drive shaft which is further coupled to the rotatable magnetic coupler for rotation therewith.

These and other features, advantages, and objects of the present invention will be further understood and appreciated by those skilled in the art by reference to the following specification, claims, and appended drawings.

DETAILED DESCRIPTION

Figure 1:
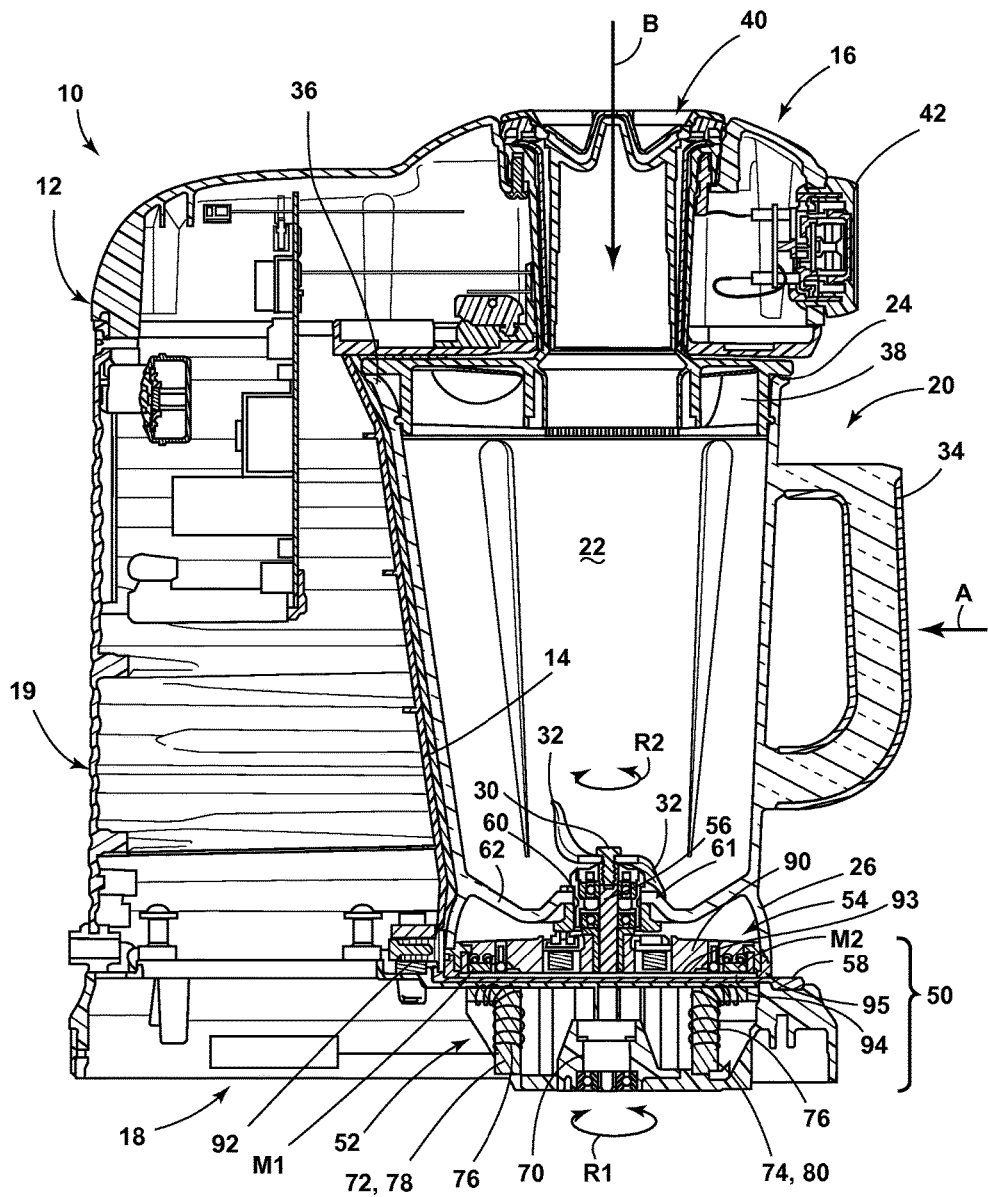
FIG. 1 is a cross-sectional view of a blending appliance having a magnetic coupling system according to an embodiment.

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a blending appliance which includes a housing 12 and a blender jar 20. In the embodiment of FIG. 1, the blender jar 20 is configured for lateral engagement or reception within the housing 12 along a path indicated by arrow A. The blender jar 20, as shown in FIG. 1, is received in a jar receiving portion 14 of the housing 12. The jar receiving portion 14 of the housing 12 is defined between an upper housing 16 and a base portion 18 which are spaced apart vertically and extended outwardly from a rear portion 19 of the housing 12. The blender jar 20 generally includes a receptacle portion 22 disposed between an open top 24 and a jar base 26. Within the receptacle portion 22, a blade assembly 30 having a plurality of blades 32 is configured to blend, or otherwise process, ingredients disposed within the receptacle portion 22 as further described below. The blender jar 20 further includes a handle 34 extending off the receptacle portion 22 and a spout 36 disposed on the open top 24 and a cover or lid 38 is configured to be received on the open top 24 of the blender jar 20. The upper housing 16 includes a feed chute 40 that provides access to the receptacle portion 22 of the blender jar 20 through the upper housing 16 and lid 38 along a feed path indicated by arrow B.

As further shown in FIG. 1, the blending appliance 10 includes a stator 52 disposed within the base portion 18. The stator 52 is configured to generate an electronically controlled rotating electromagnetic field. The stator 52 and its function are electronically controlled by an external user interface 42 disposed on the upper housing 16 in the embodiment of FIG. 1. The stator 52 is part of a magnetic coupling system 50 which also includes a rotatable magnetic coupler 54 disposed in the jar base 26 of the blender jar 20. The stator 52, as shown in FIG. 1, is disposed adjacent to a receiving deck 58 of the jar receiving portion 14 which encapsulates the stator 52 within the base portion 18 of the housing 12. The rotatable magnetic coupler 54, as rotatably coupled to the blender jar 20, is removable from the blending appliance 10 when the blender jar 20 is removed from the jar receiving portion 14. The rotatable magnetic coupler 54 is coupled to a drive shaft 56 which is received in a bearing assembly 60 disposed at an aperture 61 of a bottom wall 62 of the blender jar 20. The drive shaft 56 is further connected to the blade assembly 30 which is fully disposed within the receptacle portion 22 of the blender jar 20. Thus, as configured, the magnetic coupling system 50 magnetically couples the blender jar 20 to the base portion 18 of the blending appliance 10 through magnetic attraction generated between the stator 52 and the rotatable magnetic coupler 54, as further described below. As shown in the embodiment of FIG. 1, the rotatable magnetic coupler 54 has a generally circular or disc configuration at a prescribed diameter that mirrors the configuration of the stator 52, such that the blender jar 20 will properly seat on the receiving deck 58 due to the magnetic coupling and attraction forces between the stator 52 and the rotatable magnetic coupler 54 when the stator 52 is powered and generating the rotating electromagnetic field.

The stator 52 is mounted on a mounting bracket 70 disposed within the base portion 18 of the blending appliance 10. The stator 52 includes a series of laminations 72, 74 that are wrapped with wires 76 to form coils or windings 78, 80. The stator 52 produces an electronically controlled rotating electromagnetic field, indicated by arrow R1, by currents producing alternating poles within the adjacent coils 78, 80. Essentially, the stator 52 creates a pole that is capable of driving the rotatable magnetic coupler 54, in the jar base 26 from a South pole to a North pole in a direction as indicated by arrow R2. This rotational movement R2 is entirely driven by magnetic attraction between the rotating electromagnetic field created by the stator 52 and permanent magnets M1, M2 disposed in the rotatable magnetic coupler 54. In this way, the drive shaft 56 rotates with the rotatable magnetic coupler 54 to further drive the blade assembly 30, disposed within the receptacle portion 22 of the blender jar 20, through a magnetic torque coupling derived from the stator 52, rather than a conventional mechanical coupling.

As further shown in FIG. 1, the rotatable magnetic coupler 54 includes a generally planar body portion 90 in the form of a disc having a plurality of permanent magnetic elements, exemplified by permanent magnets M1 and M2, disposed along a periphery 92 of the disc 90 The permanent magnetic elements M1, M2 are disposed about the periphery 92 of the disc 90 to define a magnetic array as disposed therein. The permanent magnetic elements M1, M2 are individual permanent magnetic elements which are separated by portions of the disc 90 which is contemplated to be made of a non-magnetic polymeric material. The permanent magnets M1, M2 are "permanent" in that they create their own magnetic field which persists against influences which might otherwise demagnetize them. It is further contemplated that the permanent magnetic elements M1, M2 may be a continuous ring disposed in the disc 90. An air gap 94 is disposed between a bottom wall 93 of the jar base 26 and the receiving deck 58 of the base portion 18 of the housing 12. The air gap 94 is created by an outer stand-off ring 95 disposed around a lower most portion of the jar base 26. Further, the bottom wall 93 of the jar base 26 makes the jar base 26 a sealed jar base 26 for protectively housing the rotatable magnetic coupler 54 and shielding the coupler 54 from outside elements. A one-way valve may be included in the jar base 26 for venting heated air produced during the rotation of the rotatable magnetic coupler 54 within the sealed jar base 16. The air gap 94 and receiving deck 58 are exemplary embodiments of a plurality of nonmagnetic layers disposed between the stator 52 and rotating magnetic coupler 54. It is further contemplated that the disc 90 of the rotatable magnetic coupler 54 may include a backing plate on which the permanent magnetic elements M1, M2 are mounted. The backing plate may include any magnetic soft material or magnetizable material, such as mild steel. The backing plate may be a continuous ring-shaped backing plate disposed throughout within the carrier material of the disc 90. It is contemplated that the backing plate can act as a short between north and south poles of adjacent magnet assemblies, thereby reducing inefficiencies in torque delivery from the electromagnetic field of the stator 52.

It is further contemplated that a braking system may be disposed between the bearing assembly 60 and the rotatable magnetic coupler 54. The braking system is configured to stop rotation of the rotatable magnetic coupler 54 when the blender jar 20 is removed from the blending appliance 10. In other systems, the blade assembly may continue to rotate after a jar is quickly removed from a slide-in system. This can be dangerous for the user. The brake system, by stopping the rotation of the rotatable magnetic coupler 54, will also stop the rotation of the drive shaft 56 and blade assembly 30 coupled thereto for safer use.

Figure 2:
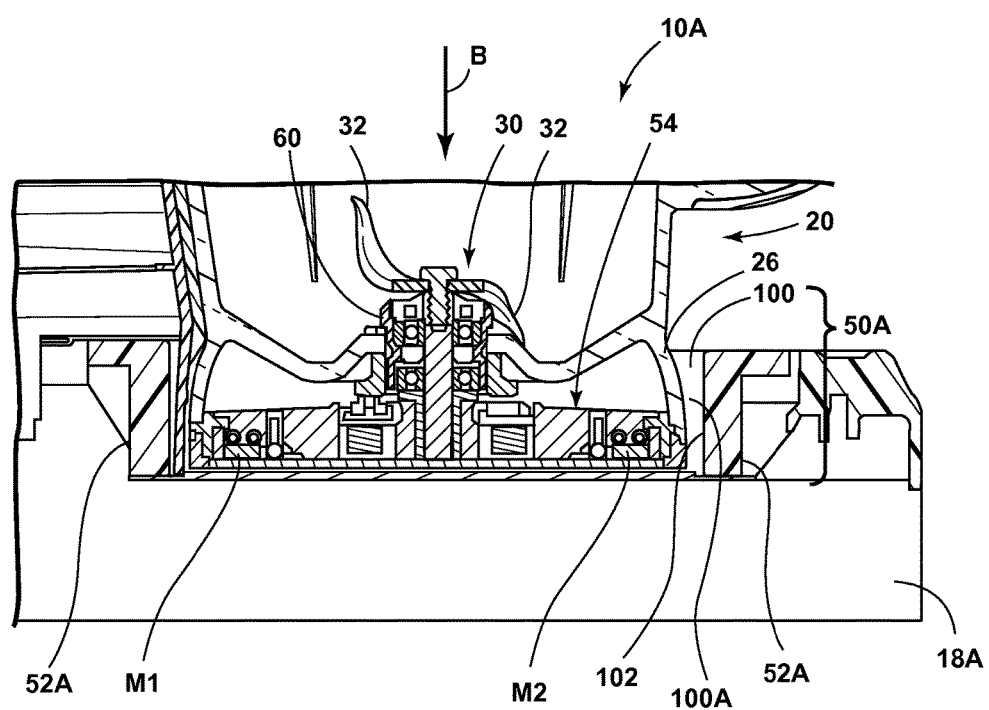
FIG. 2 is a fragmentary cross-sectional view of a blending appliance having a magnetic coupling system according to another embodiment.

Referring now to FIG. 2, another embodiment of a blending appliance 10A is shown, wherein the blender jar 20 is configured to be received within a jar holder portion 100 disposed on the upper side of a base portion 18A of the blending appliance 10A. The jar holder portion 100 includes upwardly extending walls 102 which essentially define a cavity 100A in which the jar base 26 of the blender jar 20 is received. The upwardly extending walls 102 may be in the form of a continuous ring in which the jar base 26 of the blender jar 20 is received and positively captured or retained therein. As further shown in FIG. 2, a stator 52A is disposed about upwardly extending walls 102 of the jar holder portion 100 of the blending appliance 10A, such that the stator 52A is disposed adjacent to the rotatable magnetic coupler 54 of the blender jar 20. In this way, the electromagnetic field created by the stator 52A drives the rotatable magnetic coupler 54 within the jar base 26 by lateral magnetic interaction with the permanent magnetic elements M1, M2 of the rotatable magnetic coupler 54 and the electromagnetic field produced by the stator 52A in a magnetic coupling system 50A. Thus, the blending appliance 10A differs from the embodiment shown in FIG. 1, which essentially disclosed a slide-in style blending appliance 10, which horizontally received the blender jar 20 along a path indicated by arrow A in FIG. 1. In the embodiment shown in FIG. 2, the blending appliance 10A is a set-in style blending appliance, wherein the blender jar 20 is vertically set into or received in the jar holder portion 100 of the base portion 18A of the blending appliance 10A. As such, the stator 52A of blending appliance 10A is disposed outwardly or laterally from the rotatable magnetic coupler 54 disposed in the jar base 26 of the blender jar 20. Thus, in the embodiment of FIG. 2, the stator 52A of blending appliance 10A is laterally spaced-apart from the rotatable magnetic coupler 54 and circumferentially surrounds the entire rotatable magnetic coupler 54 in assembly.

In the embodiment shown in FIG. 1, the stator 52 is disposed directly beneath the rotatable magnetic coupler 54 when the blender jar 20 is received in the jar receiving portion 14. The stators 52, 52A do not require any moving parts for the generation of the electromagnetic field used to drive the system. Thus, the magnetic coupling system 50 of FIG. 1 and the magnetic coupling system 50A of FIG. 2 both include rotatable magnetic couplers 54 disposed within the jar base 26 of the blender jar 20, while having no moving parts in the base portions, 18, 18A respectively, of the housings of the blending appliance, 10, 10A respectively. With the reduction of moving parts, the magnetic coupling systems 50, 50A reduce the chances of having a mechanical malfunction in the housing 12 of the blending appliance 10, 10A, as well as reduce the opportunities for noise and vibration caused by moving mechanical parts in the housing 12.

It is contemplated that the different embodiments of the stators 52 and 52A of the respective magnetic coupling systems 50, 50A described above may be powered by different means. Specifically, the stators 52 and 52A, in conjunction with their respective rotatable magnetic couples 54, define a motor that can be an AC or DC brushless motor, an induction motor, a switched reluctance motor, or other like electric motor capable of producing an electromagnetic field for powering the blending sequences of the blending appliances 10, 10A.

It is also important to note that the construction and arrangement of the elements of the concept as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

The invention claimed is:

1. A blending appliance, comprising:
   a housing having a jar receiving portion defined between an upper housing and a base portion laterally extending from the housing;
   a blender jar having a jar base and a receptacle portion, the blender jar configured to be laterally received within the jar receiving portion;
   a magnetic coupling system including a rotatable magnetic coupler disposed in the jar base of the blender jar and a stator disposed in the base portion of the housing, wherein the stator is disposed directly beneath the rotatable magnetic coupler when the blender jar is received within the jar receiving portion, and further wherein the stator is configured to generate an electromagnetic field to magnetically rotate the rotatable magnetic coupler within the jar base without any moving parts in the base portion of the housing; and
   a blade assembly disposed in the receptacle portion of the blender jar, the blade assembly operably coupled to a drive shaft which is further coupled to the rotatable magnetic coupler for rotation therewith.

2. The blending appliance of claim 1, including:
   one or more nonmagnetic layers disposed between the stator and the rotatable magnetic coupler.

3. The blending appliance of claim 2, wherein the one or more nonmagnetic layers includes an air gap.

4. The blending appliance of claim 3, wherein the one or more nonmagnetic layers further includes a receiving deck.

5. The blending appliance of claim 1, wherein the rotatable magnetic coupler includes a disc having a plurality of permanent magnetic members disposed therein.

6. The blending appliance of claim 1, wherein the rotatable magnetic coupler includes a disc having a permanent magnetic member in the form of a continuous ring disposed around the disc.

7. The blending appliance of claim 1, wherein the stator and the rotatable magnetic coupler define a DC brushless motor.

8. The blending appliance of claim 1, wherein the stator and the rotatable magnetic coupler define one of an induction motor and a switched reluctance motor.

9. A blending appliance, comprising:
   a housing having a base portion extending outwardly from the housing;
   a blender jar holder portion disposed on the base portion, having upwardly extending walls defining a cavity;
   a blender jar having a jar base and a receptacle portion, the blender jar configured to be vertically received within the cavity of the jar holder portion;
   a magnetic coupling system including a rotatable magnetic coupler disposed in the jar base of the blender jar and a stator disposed in the upwardly extending walls of the jar holder portion, wherein the stator is configured to generate an electromagnetic field to magnetically rotate the rotatable magnetic coupler within the jar base; and
   a blade assembly disposed in the receptacle portion of the blender jar, the blade assembly operably coupled to a drive shaft which is further coupled to the rotatable magnetic coupler for rotation therewith.

10. The blending appliance of claim 9, wherein the stator includes no moving parts for generating the electromagnetic field.

11. The blending appliance of claim 10, wherein the stator of blending appliance is laterally spaced-apart from the rotatable magnetic coupler and circumferentially surrounds the rotatable magnetic coupler when the blender jar is received in the jar holder portion.

12. The blending appliance of claim 11, wherein the rotatable magnetic coupler includes a disc having a plurality of permanent magnetic members disposed therein.

13. The blending appliance of claim 11, wherein the rotatable magnetic coupler includes a disc having a permanent magnetic member in the form of a continuous ring disposed around the disc.

14. The blending appliance of claim 13, wherein the stator and the rotatable magnetic coupler define a motor selected from the group consisting of a DC brushless motor, an induction motor and a switched reluctance motor.

15. A blending appliance, comprising:
    a housing having a horizontal jar receiving portion;
    a blender jar removeably received in the jar receiving portion and having a jar base and a receptacle portion;
    a magnetic coupling system including a rotatable magnetic coupler having one or more permanent magnets disposed in the jar base of the blender jar and a stator disposed in the housing, wherein the stator surrounds the jar base when the blender jar is received in the jar receiving portion of the housing and is configured to generate a lateral electromagnetic field without the need for moving parts, the electromagnetic field configured to magnetically rotate the rotatable magnetic coupler within the jar base; and a blade assembly disposed in the receptacle portion of the blender jar, the blade assembly operably coupled to a drive shaft which is further coupled to the rotatable magnetic coupler for rotation therewith.

16. The blending appliance of claim 15, wherein the stator is disposed below the rotatable magnetic coupler when the blender jar is received in the jar receiving portion of the housing.

17. The blending appliance of claim 16, including:

one or more nonmagnetic layers disposed between the stator and the rotatable magnetic coupler.

18. The blending appliance of claim 17, wherein the one or more nonmagnetic layers includes one of an air gap and a receiving deck.

* * * * *